(12) United States Patent
Shmelzer

(10) Patent No.: US 6,975,207 B1
(45) Date of Patent: Dec. 13, 2005

(54) WAITER CALLING APPARATUS COMBINED WITH A RECEPTACLE FOR HOLDING VARIOUS TABLE UTENSILS AND COMBINED WITH A LIGHTED ADVERTISING DISPLAY

(76) Inventor: Yaniv Shmelzer, 18631 Collins St., No. 34, Tarzana, CA (US) 91356

( * ) Notice: Subject to any disclaimer, the term of this patent is extended or adjusted under 35 U.S.C. 154(b) by 204 days.

(21) Appl. No.: 10/688,030

(22) Filed: Oct. 16, 2003

(51) Int. Cl.$^7$ .............................................. G08B 5/00
(52) U.S. Cl. ........................... 340/286.09; 340/286.06; 340/326; 340/332; 340/825.69; 340/825.72; 340/10.6; 705/15; 705/26
(58) Field of Search .............. 340/286.09, 286.06, 340/321, 326, 332, 825.69, 825.72, 7.2, 10.6; 705/15, 26

(56) References Cited

U.S. PATENT DOCUMENTS

| 3,323,240 | A | | 6/1967 | Kravitt |
| 3,821,707 | A | | 6/1974 | Peters |
| 4,432,151 | A | | 2/1984 | Morris |
| 5,347,734 | A | | 9/1994 | Howell |
| 5,489,887 | A | | 2/1996 | Porras |
| 5,594,409 | A | | 1/1997 | Shank |
| 5,699,039 | A | | 12/1997 | Korzen |
| 5,828,294 | A | | 10/1998 | Shank |
| 6,366,196 | B1 | | 4/2002 | Green |
| 6,636,835 | B2 | * | 10/2003 | Ragsdale-Elliott et al. ... 705/15 |
| 2002/0147637 | A1 | | 10/2002 | Ragsdale-Elliott |

* cited by examiner

Primary Examiner—Hung Nguyen
(74) Attorney, Agent, or Firm—Thomas I. Rozsa; Tony D. Chen

(57) ABSTRACT

A commercially viable calling apparatus which is placed on all tables of a restaurant, tavern or other establishment which serves food and/or drink so that if someone is waiting for a waiter or if someone has not been served, then there is a method to signal a central area such as a maitre d' or other person who is in charge of the waiters to advise a waiter to wait on the table.

15 Claims, 2 Drawing Sheets

WAITER CALLING APPARATUS COMBINED WITH A RECEPTACLE FOR HOLDING VARIOUS TABLE UTENSILS AND COMBINED WITH A LIGHTED ADVERTISING DISPLAY

BACKGROUND OF THE INVENTION

1. Field of the Invention

The present invention generally relates to the field of waiter calling devices for use in a restaurant to advise the waiter that a patron requires the waiter's services.

2. Description of the Prior Art

In general, various devices used to advise a waiter that a restaurant patron requires the waiter's services are known. The following patents are relevant to the field of the present invention.

1. U.S. Pat. No. 3,323,240 issued to Kravitt on Jun. 6, 1967 for "Advertising Displays" (hereafter the "Kravitt Patent");

2. U.S. Pat. No. 3,821,707 issued to Peters on Jun. 28, 1974 for "Waitress Call System For Cocktail Lounge, Restaurant, Or The Like" (hereafter the "Peters Patent");

3. U.S. Pat. No. 4,432,151 issued to Morris on Feb. 21, 1984 for "Advertising Display Apparatus" (hereafter the "Morris Patent");

4. U.S. Pat. No. 5,347,734 issued to Howell on Sep. 20, 1994 for "Modular Display Device" (hereafter the "Howell Patent");

5. U.S. Pat. No. 5,489,887 issued to Porras on Feb. 6, 1996 for "Water Signaling Device" (hereafter the "Porras Patent");

6. U.S. Pat. No. 5,594,409 issued to Shank on Jan. 14, 1997 for "Customer Activated Device" (hereafter the "'409 Shank Patent");

7. U.S. Pat. No. 5,828,294 issued to Shank on Oct. 27, 1998 for "Customer Activated Signal For Service" (hereafter the" '294 Shank Patent");

8. U.S. Pat. No. 5,699,039 issued to Korzen on Dec. 16, 1997 for "Electronic Table Pager And Display Device" (hereafter the "Korzen Patent");

9. United States Patent No. U.S. Pat. No. 6,366,196 B1 issued to Green on Apr. 2, 2002 for "Restaurant Waiter Paging System" (hereafter the "Green Patent");

10. United States Patent Application Publication No. U.S. 2002/0147647 A1 published on Oct. 10, 2002 for "Wireless Maitre D' System For Restaurants" (hereafter the "Ragsdale-Elliott" Patent Application).

The Kravitt Patent shows an advertising display. As set forth in Column 1 beginning on line 40 it states "It is the principal object of the present invention to provide advertising displays having moving objects with improved concealment of the actuating mechanism."

Referring further to Column 2 beginning on line 66 it states "Also, if desired, within the space 2 a light source 33, such as an electric lamp, can be provided, within an enclosure 34 with one or more openings 35 in the top wall 16 for the delivery of light from the source 33 onto a fixed object 36, such as an initial letter forming part of a name or an advertising symbol." This patent shows a container with an advertising medium.

The Peters Patent is a wireless call system which includes a central transmitter that is activated by the operation of any one of a multiplicity of switches respectively located at the different tables or booths at a cocktail lounge, restaurant or comparable food establishment. The key, however, in this patent is that when a customer presses his call button, a corresponding numeral on the waitresses tray is illuminated so as to inform the waitress that service is desired. Therefore, in this concept, the trays are created to have a multiplicity of indicators showing all the different tables and when a person presses the button on his table, it sends a wireless signal to the waitress's tray to light up which table needs the waitress's services.

The Morris Patent deals with the concept of having an advertising display in conjunction with items on a table which hold salt and pepper, condiments, sugar etc. It discloses a display apparatus for displaying a plurality of advertisements comprising a base, which holds condiments and comprising a plurality of condiment holding sections separated from each other by the display apparatus. The display also has various structures so that the display can be moved so that different advertisements can concurrently be shown in conjunction with the device that holds the various table utensils and condiments.

The Howell Patent also discloses the concept of a display device used in conjunction with a holder for salt and pepper, sugar, etc. The display device includes a frame with multiple display faces and a support member rotatably coupled to the frame. The support member includes a downwardly extending tab which is designed to engage the ring of a ring top condiment holder to thereby support the entire display above the condiment holder on a tabletop counter.

The Porras Patent is a waiter signaling device comprising a pole having a lower base and an upper tip end, and a light source coupled to the tip end, a power source for energizing the light source, a switch mechanism connected to the pole and operable in one orientation to energize the light source, thereby generating a signal indicating that service is required, and another orientation to de-energize the light source, thereby generating a signal indicating that service is not required, and a coupling mechanism for coupling the base to the pole. Essentially, this is a signaling device which sticks up from the table and after a patron presses the button, the light goes on to signal that service is needed at that table.

The '409 Shank Patent is an invention which comprises actuating signaling apparatus for restaurants for permitting a customer to inform service personnel that service is required. Optionally, a transmitter is actuated to generate a radiated signal which turns on one or more remote indicators.

Specifically, referring to Column 2 it states "Functionally, the remote indicator 12 provides a central location permitting service personnel to determine which customer desires service. The remote indicator may be positioned at any location selected to permit the service personnel to periodically and conveniently determine which customer desires service. The portable annunciators which may resemble pagers, include a suitable indicator to permit service personnel to determine which customer desires service without access to either the customer activated device 10 or the remote indicator 12. Thus, in a typical system the service person responsible has three possible methods of determining that a customer desires service."

The '204 Shank Patent is also a customer activated signal for service. This is a continuation-in-part of the previously discussed '409 Shank Patent. The invention relates to signaling systems of the type used by customers in a service facility such as taverns, restaurants and stores to alert service personnel that a specific customer desires service. The Shank Patent discloses a customer activated signal for service. The invention relates to signaling system by a customer to signal that a waiter and service is needed. Referring to the bottom of Column 1 and extending to the top of Column 2, the signal is a local indicator 10 comprising an enclosure 11 that houses a signal light 12, a proximity sensor 13, a battery 14, and a bistable circuit 15 operably connecting the signal light 12 with the proximity sensor 13 and the battery 14. The enclosure with the light can be in the form of a simulated beer bottle.

Effectively, this is a wireless system but what it does is enable someone to break a circuit so that by putting your hand out to break the circuit, you can cause the signal light to go on to show that service is needed.

The Korzen Patent is a menu stand or like device which is employed as a signal device to summon a waiter to a table in a restaurant. The device includes a housing having a base that supports it on a table and a low energy demand light source.

Referring to Column 1 beginning on line 31 it states "The invention relates to a signal device for summoning a waiter to a table . . . . A low-energy-demand high-voltage A.C. energized light source is mounted on a housing. An inverter mounted in the housing generates an A.C. output signal from a low-voltage D.C. input." This patent deals with the detailed electronic circuitry but essentially the concept is that there is a light on the menu stand to indicate that service is needed at that table.

The Green Patent discloses a restaurant waiter paging system. The device discloses a waiter paging system for use in a restaurant. The system includes a plurality of table transmitters which transmit a waiter call signal and a plurality of pager units, there being one pager unit for each waiter. The pager unit notifies the waiter via a vibrator or buzzer that a request has been received and displays the request. In one embodiment, the system includes a central unit which receives the waiter call signal from the table transmitter and which effectively relays the waiter call signal to the pager units. In a second embodiment, there is no central unit. Rather, the waiter page unit receives a waiter call signal directly from the table transmitters. Each pager unit is associated with a set of tables (and hence table transmitters), each set of tables being fewer than all the tables in the restaurant. In either of the two systems, the set of tables with which an individual pager is associated can be selectively altered. In the first (centralized) system, the central unit can be selectively switched between a programming mode and a non-programming mode and includes means for altering the pager/table associations. In the second (non-centralized) system, the pager units are programmable, and can be switched between a programming mode and an operational mode.

The Ragsdale-Elliott Patent Application is an improved wireless maitre d' system which provides electronic interactive communication with a waiter/waitress for expediting and resolving menu orders made by local and remote patrons. The system includes a pager unit configured to fit in the palm of a waiter/waitress with multi-line scrolling and buffer capabilities for receiving and transmitting messages.

While the general concept of a waiter paging system has been known as illustrated in the above patents and patent applications, to the best of the inventor's knowledge, none of these systems have been implemented in any restaurants or taverns. There is a significant need for a practical waiter paging system which will be commercially viable and implemented in eating establishments.

SUMMARY OF THE INVENTION

The present invention is a commercially viable calling apparatus which is placed on all tables of a restaurant, tavern or other establishment which serves food and/or drink so that if someone is waiting for a waiter or if someone has not been served, then there is a method to signal a central area such as a maitre d' or other person who is in charge of the waiters to advise a waiter to wait on the table.

It has been discovered that a major reason that prior art waiter calling systems have not been commercially implemented is because restaurants and other establishments have been unwilling and/or cannot afford to place such a system in their establishment.

It has been discovered, according to the present invention, that if a means is provided for a third party to pay for the cost of implementing a waiter calling system in a restaurant or other establishment, then the restaurant will be willing to implement the system since they are receiving it for free.

Specifically, it has been discovered that if the waiter calling system is combined with an illuminated advertising display which is activated when a patron summons a waiter, the third party advertisers will be willing to pay for the systems which illuminates their advertisement when a patron summons a waiter.

The present invention includes a central calling unit where there is an apparatus on the table which includes a pushbutton where the patron pushes the button on the apparatus and a light or other indicia lights up in a central area such as the podium where the maitre d' is standing or in some other central area so that the central person is advised by a lighted signal that a patron at a specific table needs a waiter. Thereafter, the person at the central area can have a signaling means which is a device worn on each waiter to buzz or otherwise signal the waiter to advise the waiter to come to the central area to be instructed to wait on the specific table. The system also envisions some other wireless paging mechanism or wireless two-way communication wherein the central person advises the waiter that the individual at the table needs the waiter's services. In addition to the pushbutton, the apparatus on the table also incorporates a structure which can be a device which holds a salt and pepper shaker, napkins, silverware and/or a small menu for desert or drinks. The major innovation of the present invention is that the apparatus also incorporates one or more advertising displays on the apparatus which illuminates when the pushbutton is pressed. Therefore, at the same time that the patron pushes the button to send a message to the central area that he needs a waiter, the light would light up to illuminate the advertising and call that patron's attention to the advertising while the patron is staring at the apparatus. The illumination means can be light emitting diodes or comparable illumination means within the apparatus to light up the advertising. By having the advertisement incorporated within the apparatus and having the advertisement illuminated concurrently with the patron pushing the signaling button so that the patron's attention is directed to the advertisement, advertisers would be willing to purchase advertising space which will pay for the cost of the system so that the present invention waiter calling system can be given to the restaurant by an advertiser in exchange for the advertisement. Therefore, the restaurant will be willing to implement the system since it is getting it for free.

It is therefore an object of the present invention to have a device on a table for signaling a central area in order to advise the central area that the person at the table needs the waiter, which device is combined with a structure which holds items such as salt and pepper shakers, napkins, silverware etc. and most importantly, is also combined with an advertising indicia on the side of the device structure which advertising indicia is concurrently illuminated when the patron activates the device.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
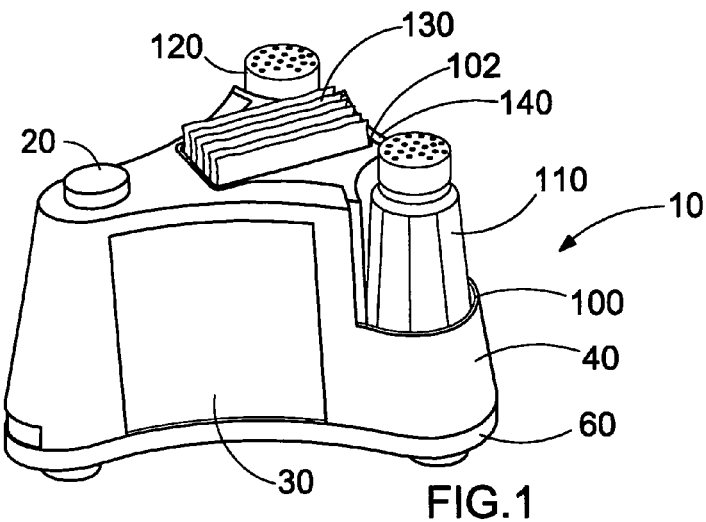
FIG. 1 is a perspective view of the present invention in the non-operational mode.

Referring to FIG. 1, there is illustrated a perspective view of the present invention waiter calling apparatus 10. The apparatus 10 comprises a structure which can house various items for use when eating. Most important to the uniqueness of the present invention is the waiter call button 20 and the advertising display 30 which is illuminated concurrently with the activation of the waiter call button 20.

Figure 3:
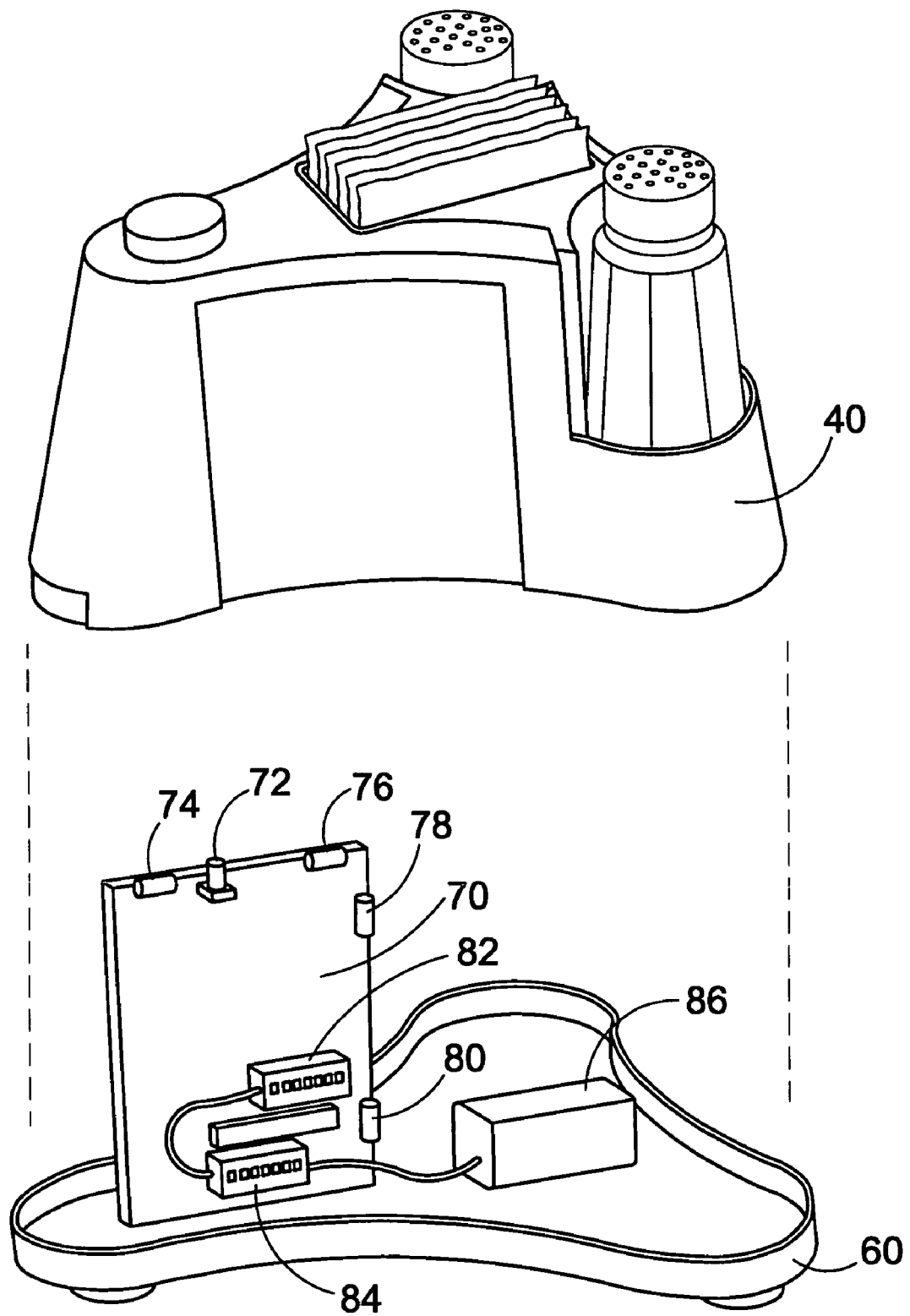
FIG. 3 is a an exploded view of the present invention with the cover removed to illustrate the internal components.

FIG. 3 is an exploded view of the present invention waiter calling apparatus 10 with the hollow cover 40 removed to illustrate the internal components of the apparatus 10 including a base 60 which supports the internal components within the hollow cover 40. The internal components include a circuit board 70 which has a push switch 72 connected directly below the call button 20. The circuit board 70 includes a multiplicity of illumination means illustrated at 74, 76, 78 and 80. By way of example, the illumination means 74, 76, 78 and 80 can be light emitting diodes (LEDs). The circuit board 70 also contains electrical connector means 82 and 84 which are connected to a transmitting device 86. When the call button 20 is pushed or depressed, it directly activates the push switch 72 which closes the electrical circuit on the circuit board 70 which concurrently activates the illumination means 74, 76, 78 and 80 and also concurrently activates the transmitter 86 to send a signal to a receiving means.

Figure 2:
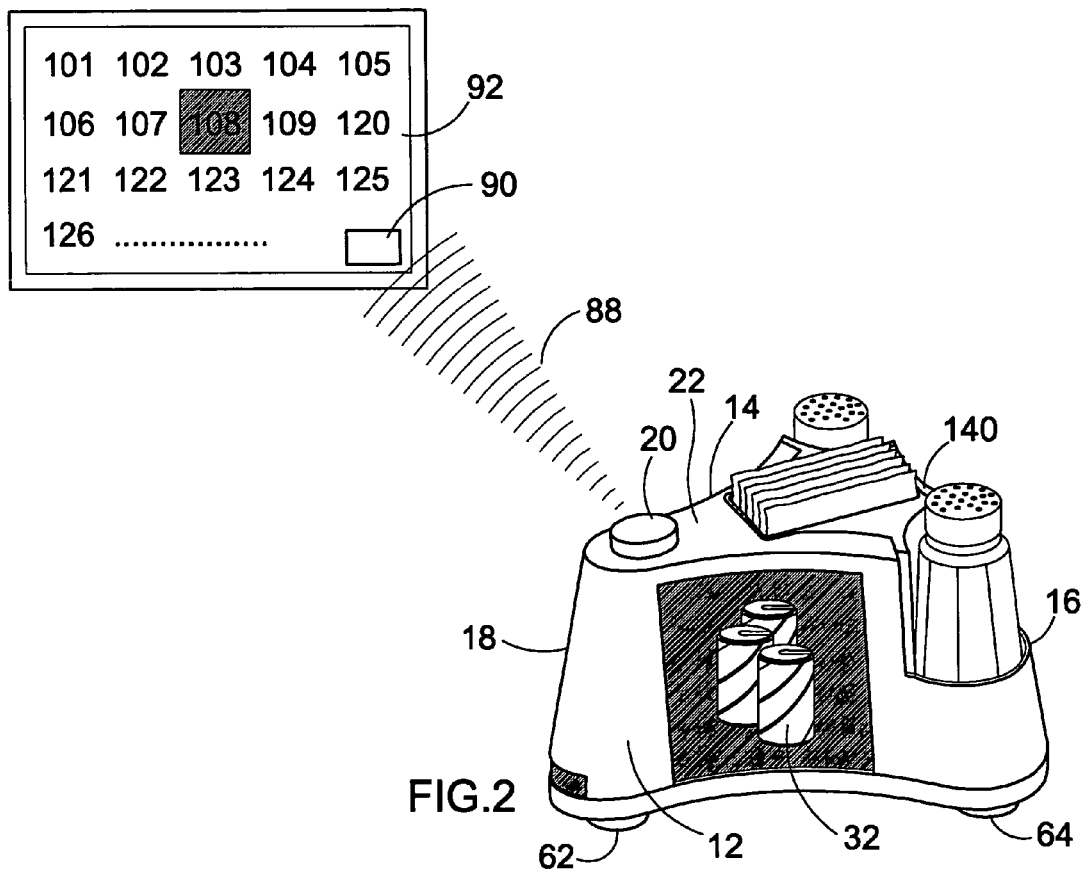
FIG. 2 is a perspective view of the present invention in the operational mode.

FIG. 2 is a perspective view of the present invention in the operational mode. The call button 20 is pushed which activates the circuit board and its components as discussed above. The advertisement 30 is concurrently illuminated by the illumination means 74, 76, 78 and 80 so that the message or visual display 32 on the advertising display 30 is prominently visible to the patron who activated the call button 20. Concurrently, the transmitter 86 sends a signal 88 to receiver 90 located on a display panel 92 which has a grid setting forth the various table numbers. Each table number is illuminated by an illumination means such as an LED and is computer coded to the transmitter 86 at each table so that the signal 88 from a specific transmitter 88 will illuminate the corresponding table number on the display panel 92. In the embodiment illustrated, the specific waiter calling apparatus 10 is placed on table number 108 so that when its transmitter 86 sends signal 88 to receiver 90, the number 108 is illuminated on the display panel 92 as illustrated in FIG. 2. The display panel 92 is situated in an area where the maitre d' or other supervisor of the waiters is located so that a person can immediately advise a waiters to provide service to the table where the call button 20 was activated.

The base 60 and a multiplicity of feet, each of which 62 and 64 are illustrated. The feet serve to elevate the base 60 above the top of the table on which the device is placed.

The uniqueness of the present invention is that the waiter calling apparatus 10 is combined with an illuminated advertising display which is illuminated concurrently with the activation of the call button 20 so that the patron who pushes the call button 20 is looking at the apparatus 10 while the advertisement 30 and its visual display 32 are illuminated so that the advertising message will definitely be viewed by the patron.

The circuit board 70 can be configured so that the illumination means 74, 76, 78 and 80 remain illuminated for a given period of time after the call button is activated. By way of example only, the illumination means can remain illuminated for thirty (30) seconds after the call button is activated.

Although only one advertisement 30 is illustrated on a side 12 of apparatus 10, the apparatus 10 can house a multiplicity of advertisements on its reverse side 14, or its back side 16, or its front side 18 and/or its top 22.

While the activation means 20 has been described as a call button 20, it will be appreciated that other activation means to activate the circuit board and cause the illumination means to be illuminated and cause the transmitter to send the signal are within the spirit ane scope of the present invention.

It will further be appreciated that while four illumination means 74, 76, 78 and 80 were illustrated in FIG. 3, it is within the spirit and scope of the present invention to have at least one illumination means and any number of illumination means to illuminate at least one advertisement or any multiplicity of advertisements on the apparatus 10.

When the apparatus 10 is assembled as illustrated in FIG. 1, the cover 40 is removably affixed to the base 60 to conceal the internal components. The apparatus 10 has compartments such as 100 and a symmetrical compartment (not shown) to respectively hold a salt shaker 110 and a pepper shaker 120. The apparatus 10 also has a compartment 102 in its top 22 to hold sugar packets 130 or any other item such as cleaning wipes. The rear side 16 can also have a slot 140 for holding a small menu for deserts or alcoholic beverages. Therefore, the apparatus provides a functional device to hold items useful at the table in addition to providing the waiter calling device.

The display 32 can have any desired indicia instead of just table numbers to signal which table requires service.

Defined in detail, the present invention is a waiter calling apparatus to advise that a patron at a given table needs the waiter, comprising: (a) a structure including a base having a lower surface, an upper surface and a base sidewall surrounding the upper surface of the base, and a hollow cover having a top surface and a sidewall configured in the same shape as the base, the cover removably attached to the base adjacent to and internally of the base sidewall to thereby form a hollow chamber bounded by the top surface of the base and the interior of the sidewall and interior of the top surface of the cover; (b) a circuit board supported on the base within the hollow chamber, the circuit board including a push switch, a multiplicity of illumination means, and electrical connection means connected to a transmitting device also housed within the hollow chamber; (c) at least one advertisement supported by the sidewall of the cover, the advertisement being illuminated by the illumination means when the illumination means is activated; (d) a call button supported within the top surface of the cover and coming into contact with the push switch when the call button is depressed; (e) when the call button is depressed, the circuit board is activated to concurrently cause the illumination means to become activated for a period of time and concurrently illuminates the advertisement and also concurrently the transmitter is activated to send a signal; (f) a display panel having a multiplicity of table numbers with each table number illuminated by a respective illumination means when activated, the display panel also housing a receiver which receives a signal from the transmitter; and (g) the transmitter and receiver electrically coupled so that when the transmitter sends a signal, it is accepted by the receiver which determines from which table the transmitter generated the signal and causes the corresponding table number to be illuminated on the display panel.

Defined broadly, the present invention is a calling apparatus to advise that a patron at a given table requires service, comprising: (a) a structure including a base having a hollow cover removably supported by the base, and a hollow chamber bounded by the interior of the cover and the base; (b) electrical means within the hollow chamber, the electrical means including an electrical activation means, at least one illumination means and a transmitting device; (c) at least one advertisement associated with the sidewall of the cover, the at least one advertisement being illuminated by the illumination means when the illumination means is activated; (d) a calling activation means supported by the cover and activating the electrical activation means when the calling activation means is activated by the patron; (e) upon activation of the electrical activation means the at least one illumination means is concurrently activated and illuminates the at least one advertisement for a period of time and the transmitting device is concurrently activated to emit a signal; (f) a display panel having a multiplicity of indicia to identify each table, each indicia illuminated by a respective illumination means when activated, the display panel also housing a receiver which receives a signal from the transmitting device; and (g) the transmitting device and receiver configured so that when the transmitting device sends a signal, it is accepted by the receiver which determines from which table the transmitting device emitted the signal and causes the corresponding indicia on the display panel to be illuminated.

Defined more broadly, the present invention is a calling apparatus to advise that a patron at a given location, comprising: (a) a structure having an exterior surface and a hollow interior; (b) electrical means within the structure, the electrical means including an electrical activation means, at least one illumination means and a transmitting means; (c) at least one advertisement associated with the sidewall of the structure, the at least one advertisement being illuminated by the illumination means when the illumination means is activated; (d) a calling activation means supported on the structure and activating the electrical activation means when the calling activation means is activated; (e) upon activation of the electrical activation means the at least one illumination means is concurrently activated and illuminates the at least one advertisement for a period of time and the transmitting means is concurrently activated to emit a signal; (f) a display panel having a multiplicity of indicia to respectively identify a given location, each indicia illuminated by a respective illumination means when activated, the display panel also housing a receiver which receives a signal from the transmitting means; and (g) the transmitting means configured so that when the transmitting means sends a signal, it is accepted by the receiver which determines from which location the transmitting means emitted the signal and causes the corresponding indicia on the display panel to be illuminated.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A waiter calling apparatus to advise that a patron at a given table needs the waiter, comprising:
   a. a structure including a base having a lower surface, an upper surface and a base sidewall surrounding the upper surface of the base, and a hollow cover having a top surface and a sidewall configured in the same shape as the base, the cover removably attached to the base adjacent to and internally of the base sidewall to thereby form a hollow chamber bounded by the top surface of the base and the interior of the sidewall and interior of the top surface of the cover;
   b. a circuit board supported on said base within said hollow chamber, the circuit board including a push switch, a multiplicity of illumination means, and electrical connection means connected to a transmitting device also housed within said hollow chamber;
   c. at least one advertisement supported by said sidewall of said cover, the advertisement being illuminated by said illumination means when the illumination means is activated;
   d. a call button supported within said top surface of said cover and coming into contact with said push switch when the call button is depressed;
   e. when said call button is depressed, said circuit board is activated to concurrently cause said illumination means to become activated for a period of time and concurrently illuminates said advertisement and also concurrently said transmitter is activated to send a signal;
   f. a display panel having a multiplicity of table numbers with each table number illuminated by a respective illumination means when activated, the display panel also housing a receiver which receives a signal from said transmitter; and
   g. said transmitter and receiver electrically coupled so that when said transmitter sends a signal, it is accepted by the receiver which determines from which table the transmitter generated the signal and causes the corresponding table number to be illuminated on the display panel.

2. A waiter calling apparatus in accordance with claim 1 wherein said illumination means on said circuit board are light emitting diodes.

3. A waiter calling apparatus in accordance with claim 1, wherein said illumination means on said display panel are light emitting diodes.

4. A waiter calling apparatus in accordance with claim 1, wherein said cover further comprises means to retain a salt and pepper shaker and sugar packets.

5. A waiter calling apparatus in accordance with claim 1, wherein the lower surface of said base has a multiplicity of feet.

6. A calling apparatus to advise that a patron at a given table requires service, comprising:
 a. a structure including a base having a hollow cover removably supported by said base, and a hollow chamber bounded by the interior of the cover and the base;
 b. electrical means within said hollow chamber, the electrical means including an electrical activation means, at least one illumination means and a transmitting device;
 c. at least one advertisement associated with said sidewall of said cover, the at least one advertisement being illuminated by said illumination means when the illumination means is activated;
 d. a calling activation means supported by said cover and activating said electrical activation means when said calling activation means is activated by said patron;
 e. upon activation of said electrical activation means said at least one illumination means is concurrently activated and illuminates said at least one advertisement for a period of time and said transmitting device is concurrently activated to emit a signal;
 f. a display panel having a multiplicity of indicia to identify each table, each indicia illuminated by a respective illumination means when activated, the display panel also housing a receiver which receives a signal from said transmitting device; and
 g. said transmitting device and receiver configured so that when said transmitting device sends a signal, it is accepted by the receiver which determines from which table the transmitting device emitted the signal and causes the corresponding indicia on the display panel to be illuminated.

7. A calling apparatus in accordance with claim 6 wherein said at least one illumination means is a light emitting diode.

8. A calling apparatus in accordance with claim 6, wherein said illumination means on said display panel are light emitting diodes.

9. A calling apparatus in accordance with claim 6, wherein said cover further comprises means to retain a salt and pepper shaker and sugar packets.

10. A calling apparatus in accordance with claim 6, further comprising a multiplicity of feet supporting said base.

11. A calling apparatus to advise that a patron at a given location, comprising:
 a. a structure having an exterior surface and a hollow interior;
 b. electrical means within said structure, the electrical means including an electrical activation means, at least one illumination means and a transmitting means;
 c. at least one advertisement associated with said sidewall of said structure, the at least one advertisement being illuminated by said illumination means when the illumination means is activated;
 d. a calling activation means supported on said structure and activating said electrical activation means when said calling activation means is activated;
 e. upon activation of said electrical activation means said at least one illumination means is concurrently activated and illuminates said at least one advertisement for a period of time and said transmitting means is concurrently activated to emit a signal;
 f. a display panel having a multiplicity of indicia to respectively identify a given location, each indicia illuminated by a respective illumination means when activated, the display panel also housing a receiver which receives a signal from said transmitting means; and
 g. said transmitting means configured so that when said transmitting means sends a signal, it is accepted by the receiver which determines from which location the transmitting means emitted the signal and causes the corresponding indicia on the display panel to be illuminated.

12. A calling apparatus in accordance with claim 11 wherein said at least one illumination means is a light emitting diode.

13. A calling apparatus in accordance with claim 11, wherein said illumination means on said display panel are light emitting diodes.

14. A calling apparatus in accordance with claim 11, wherein said cover further comprises means to retain a salt and pepper shaker and sugar packets.

15. A calling apparatus in accordance with claim 11, further comprising a multiplicity of feet supporting said base.

* * * * *